3,775,521
METHOD OF PRODUCING PAPER-LIKE THERMO-PLASTIC SYNTHETIC RESIN FILMS
Sadao Yamamoto, Kyoto, Seiichirou Honda, Osaka, Hisataka Shimizu, Kyoto, and Kanzi Oguma, Osaka, Japan, assignors to Sekisui Kagaku Kogyo Kabushiki Kaisha, Osaka, Japan
No Drawing. Continuation-in-part of abandoned application Ser. No. 838,652, July 2, 1969. This application Dec. 7, 1971, Ser. No. 205,703
Claims priority, application Japan, July 6, 1968, 43/47,372
Int. Cl. B29d 27/00; B29b 1/04
U.S. Cl. 264—45         2 Claims

ABSTRACT OF THE DISCLOSURE

A process for the preparation of paper-like thermoplastic synthetic films on which pencil, fountain pen or similar writing instrument can be used to write as on ordinary paper from pulp, and which can be printed with ordinary printing ink comprising melt mixing and kneading a composition comprising per 100 parts of an olefin resin, 5 to 50 parts of at least one additive resin selected from the group consisting of styrene resins, methyl methacrylate resins, acetal resins, phenoxy resins, vinyl chloride resins, vinyl acetate resins and amide resins, and 10 to 300 parts of an inorganic filler, shaping the melt mixed and kneaded composition into a sheet, and thereafter stretching the sheet biaxially at a temperature ranging from 100° to 170° C.

---

This application is a continuation-in-part of application Ser. No. 838,652 filed July 2, 1969 now abandoned.

This invention relates to a method of producing paper-like films composed mainly of olefin-type resins.

Various types of paper-like thermoplastic synthetic resin films have been heretofore prepared. For example, there have been known techniques of processing films of synthetic resins such as polyvinyl chloride, polystyrene, polyethylene, polyester and cellulose acetate to impart printability and graphic property thereto.

Conventional processing methods of such resin films into paper-like ones include that of making the film surface aventurine with embossing rolls, sand blasting, etc.; that of fixing a finely divided inorganic substance on the film surface by applying onto the film surface a liquified resin in which the inorganic substance is dispersed; that of making the film surface white or cellular by applying and infiltrating into the film surface a solution capable of chemically dissolving or swelling the film and then removing the solution by solvent (solution) substitution, heating or other suitable means; and that of perforating the film surface with corona discharge, etc.

However, while paper-like thermoplastic synthetic resin films obtained by such known methods possess favorable properties, such as water resistance, as compared with paper from pulp, their graphic properties and printability are still unsatisfactory. Further, such paper-like thermoplastic synthetic resin films are expensive and their utility is limited.

A method is also known of molding a synthetic resin composition, such as of an olefin resin, which contains an inorganic substance dispersed therein, into a film serving as a paper-like film. However, in this method, the moldability of the composition is quite unsatisfactory because of the presence of the inorganic substance. Thus, in this method the film formation is very difficult, and furthermore the resulting paper-like film is unsatisfactory because of its poor physical strength, though its printability and graphic property are somewhat improved over those of the first-mentioned paper-like film. Also the last-mentioned paper-like film exhibits properties, such as elongation, detrimental for paper quality.

U.S. Pat. 3,515,626 describes thermoplastic laminates comprising layers of oriented films of thermoplastic materials in which one of the outermost layers contains a suitable inert additive, the laminates being described as useful films which may be written on with pencil or crayon. The additives which are disclosed as useful in accordance with such product are said to include dyes, pigments, anti-static agents, inert materials such as silica, clays, abrasives, etc., and polymers other than those from which the film is produced. The patentee points out that a polyamide may be incorporated into polyethylene and terephthalate films, a particularly suitable composition being one in which the outermost layer or layers of the laminate are films of polyethylene terephthalate containing up to 25% by weight of a polyamide. In this regard, it is stated that to produce a product having a write-on surface the outermost layer or layers should contain 1%–25% of the inert material.

The structural laminate set forth in U.S. Pat. 3,515,626 is formed for example by extruding plies of thermoplastic film from an extruder having a triple orifice and laminating the three plies during extrusion. Accordingly, a truly multi-layered structure is produced wherein an outermost layer of the laminated prodct contains additives while the inner layer is free from the same. This provides certain disadvantages including the fact that if sufficient sheet strength is applied to the laminated product, the sheet is severed by the boundary surface between the outermost layer and inner layer and the graphic properties of the film are destroyed. Also, the product has a haze value developed in the outermost layer due to the presence of an inert material in such outermost layer, although the haze value of the laminated sheet material as a whole is small since the inner layer of the sheet material is transparent. Accordingly, a product having properties similar to paper with good mechanical strength, resistance to folding, tear resistance, tensile strength, etc., cannot be provided through a laminated product such as disclosed in such prior art. More specifically, U.S. Pat. 3,515,626 exemplifies a laminated structure wherein up to 25% of a single additive is utilized to obtain a write-on surface. Since, however, the additive is incorporated in the outermost layers, the additive tends to pop out of the surface providing a rough surface. Accordingly, while the structured laminate set forth in U.S. Pat. 3,515,626 may be written on by pencil or crayon, such product is totally insufficient with regard to printability with printing ink, etc.

Briefly, it has been found that paper-like thermoplastic synthetic resin films free of the above-mentioned defects of the conventional resin films can be produced by molding a mixture comprising an olefin resin and a specific resin into a sheet and biaxially stretching the sheet, and that when an inorganic filler is further incorporated in the above resin mixture, the multicellular and multi-layered structure is further improved, resulting in formation of a film having properties quite similar to those of paper from pulp.

While the product of the present invention is defined above and hereinbelow as a multi-layered structure, such structure is clearly distinguishable from the laminated structure as set forth, for example, in U.S. Pat. 3,515,626 discussed above. In this regard, as will be indicated hereinafter, the multi-layered structure of the present invention is not formed through a laminating process but, rather, is formed by shaping a specific composition having a specified proportion of constituents into a single-layered sheet and thereafter stretching the sheet under specified conditions to form a cellular multi-layer film. In this regard, the multi-layered structure of the present invention is one in which cellular multi-layers approximately in parallel with the surface of the sheet are three-dimensionally present one on another throughout the sheet in the direction of thickness thereof so as to form a truly three-dimensional, porous network. In addition, the necessary additive resin and inorganic filler are dispersed throughout the entire three-dimensional network in such proportions and in such a manner as to produce a sythetic paper product having excellent graphic properties including the ability to be written on by ink or pencil and through printing.

The object of this invention is to produce paper-like thermoplastic synthetic resin films on which pencil, fountain pen and similar writing instruments can be used to write as on ordinary paper from pulp, and which can be printed with ordinary printing inks.

Another object of this invention is to produce paper-like thermoplastic synthetic resin films having more excellent water proofness, moisture proofness and chemical resistance than those of paper from pulp and having a touch quite similar to that of paper from pulp.

Still another object of this invention is to produce paper-like thermoplastic synthetic resin films which can be cut and folded in a manner similar to paper from pulp.

A still further object of this invention is to produce elastic paper-like thermoplastic synthetic resin films possessing wrapping or packing ability equal to, or superior to, that of paper from pulp.

Other objects and advantages of this invention will become apparent from the following, more detailed description thereof.

The above objects can be attained by the process comprising melt mixing and homogeneously kneading a composition comprising per 100 parts by weight of olefin resins (A) 5 to 50 parts by weight of at least one additive resin selected from the group consisting of styrene resins, acetal resins, vinyl chloride resins, vinyl acetate resins, acrylate resins, phenoxy resins and amide resins, and (B) 10 to 300 parts of inorganic fillers, shaping the melt mixed kneaded composition into a sheet, the total of (A) and (B) preferably being at least 45.0 parts per 100 parts of olefin resin, and thereafter stretching the sheet biaxially at a temperature ranging from 100° C. to 170° C.

The olefin resin to be used in this invention includes high density polyethylene, medium density polyethylene, low density polyethylene, ethylene-vinyl acetate copolymers, ethylene-vinyl chloride copolymers, ethylene-ethyl acrylate copolymers, ethylene-acrylic acid ionomers, ethylene-propylene copolymers, chlorinated polyethylene, polypropylene, propylene-vinyl chloride copolymers, propylene-styrene copolymers, polybutene-1 and the like. Such olefin resins may be used singly, or in admixture. If the olefin resin is a copolymer such as an ethylene/vinyl acetate copolymer, it should have an olefin content of at least 50%, preferably at least 60%. Among such resins, one composed mainly of a high density polyethylene or a polypropylene having more than 70% of an isotactic structure is particularly preferred, and the use of such resin results in a paper-like film having particularly excellent properties.

The styrene resin to be used in this invention includes polystyrene, poly-α-methylstyrene, styrene-butadiene copolymers having a high styrene content, high impact polystyrene, acrylonitrile-butadiene-styrene copolymer, acrylonitrile-styrene copolymer, styrene-methylene methacrylate copolymer and the like. The copolymers of styrene with other monomers have a styrene content of at least 50%. As the acetal resin, polyacetals and copolymers of acetal with other monomers may be used. The copolymers of acetal with other monomers have an acetal content of at least 50%. As the vinyl chloride resin, polyvinyl chloride, vinyl chloride-vinylidene chloride copolymers, vinyl chloride-ethylene copolymers, vinyl chloride-vinyl acetate copolymers and the like may be used. The copolymer of vinyl chloride with other monomers have a vinyl chloride monomer of at least 50%. As the vinyl acetate resin, polyvinyl acetate, vinyl acetate-ethylene copolymers, vinyl acetate-vinyl chloride copolymers and the like may be used. The copolymers of vinyl acetate with other monomers have a vinyl acetate content of at least 50%. As the acrylate resin, polymethyl methacrylate, methyl methacrylate-styrene copolymer, methyl methacrylate - α-methylstyrene copolymers, ethyl acrylate-ethylene copolymers and the like may be used. The copolymers of an acrylic ester with other monomers have an acrylic ester content of at least 50%. Either a phenoxy resin of a paint grade or a phenoxy resin of a mold grade may be used as the phenoxy resin. Nylon 6, nylon-6-nylon 610 copolymer and modified nylons as N-methoxy methyl nylon are usable as the amide resin. Such additive resins may be used singly or in comibnation. The amounts of such additive resins used are influenced by the class of the additive resin, the intended use of the resulting paper-like film, the class of the olefin resin, the amount and class of the inorganic filler, the molding condition and the like, but generally, such resins are used in an amount of 5 to 50 parts by weight based on 100 parts of the olefin resin.

In this invention, an inorganic filler is further added to a mixture of the olefin resin and the above-mentioned additive resin such as a styrene resin, and a homogeneous composition is prepared. For the purpose of improving moldability of the composition and physical properties of the resultant film and increasing the amount of the inorganic filler in the composition, natural rubber or synthetic rubber such as polyurethane rubber, styrene-butadiene rubber, acrylonitrile- butadiene rubber, poly-butadiene rubber ad propylene oxide rubber may be added to the composition. Such rubber is used in amounts not exceeding the total amount of the olefin resin, the additive resin such as a styrene resin and the inorganic filler. If an additive resin already containing rubber such as high impact polystyrene is used, this must be considered in adding the rubber to the composition.

As the inorganic filler, diatomaceous earth, white carbon, talc, kaoline, zeolite, mica powder, asbestos powder, calcuim carbonate, magnesium carbonate, calcium sulfate, clay, silica powder, alumina magnesium sulfate, barium sulfate, zinc sulfide, titanium oxide, zinc oxide and the like are preferably used. It is preferred that such inorganic fillers have an average particle size of less than $20\mu$, particularly less than $10\mu$. Such inorganic fillers are used in amounts of 10 to 300 parts by weight, preferably 20 to 100 parts by weight, based on 100 parts by weight of the olefin resin. Among such inorganic fillers, diatomaceous earth, white carbon, talc, kaoline, zeolite, mica powder and asbestos powder are particularly preferred. In the case of other fillers, it is preferred to add more than 5 parts by weight of the above particularly preferred fillers, such as diatomaceous earth.

In the present invention it is also possible to further add other various additives to the above-mentioned composition. For instance, when a vinyl chloride resin or the like is used as the additive resin, it is preferred to add a plasticizer, a stabilizer or other similar agents. Further, for promoting the dispersion of the inorganic filler, it is advantageous to use a surfactant, a dispersing agent or other similar agent. It is also possible to add an ultraviolet ray absorbent or an antioxidant so as to improve weatherability of the resultant film, or to add an antistatic agent.

The above-mentioned specific composition comprising 100 parts by weight of an olefin resin, 5 to 50 parts by weight of an additive resin such as a styrene resin, 10 to 300 parts by weight of an inorganic filler, and a rubber and/or an additive, is molded into a sheet and biaxially stretched, thus resulting in an excellent paper-like film. The sheet molded from the above specific resin composition, though a good sheet, has a tendency of sometimes undergoing the separation of the olefin resin from the additive resin such as a styrene resin. The sheet is formed into a film closely resembling paper from pulp only by biaxially stretching it to thereby make the sheet have a multi-cellular, multi-layered structure.

The above-mentioned specific composition is melt mixed sufficiently by means of a mixing roll, a Banbury mixer, an extruder or the like, and then molded into a sheet by means of a calender roll, an extruder or the like. Generally, the molding is performed in a manner such that the resultant sheet has a thickness of 0.2 to 5.0 mm., preferably 0.3 to 3.0 mm.

Then, the sheet is biaxially stretched at a temperature of 100° C. to 170° C. in a manner such that the stretch ratio in at least one direction is higher than 1.5. In case the olefin resin in the composition is composed mainly of polyethylene or a copolymer of ethylene with another monomer, it is particularly preferred that the biaxial stretching is conducted at a temperature of 110° C. to 155° C. In case the olefin resin is composed mainly of polypropylene or a copolymer of propylene with another monomer, it is particularly preferred that the biaxial stretching is carried out at a temperature of 115° C. to 160° C. Still further, when the olefin resin is composed mainly of polybutene-1 or a copolymer of butene-1 with another monomer, it is particularly preferred that the biaxial stretching is performed at a temperature of 100° C. to 150° C. In case the stretching temperature is lower than 100° C., the stretching is very difficult, and in case the stretching temperature exceeds 170° C., the resultant film does not have a suitable multi-cellular, multi-layered structure, and no paper-like film having good properties can be obtained. The biaxial stretching is generally conducted in a manner such that the stretch ratio in at least one direction is higher than 1.5, but the stretch ratios are optionally determined depending on the use of the resultant film and the mixing ratio of the components in the composition. The stretching speed is optionally selected based on the stretching temperature, the intended stretch ratio and the like.

The decrease in thickness of the stretched film as compared with the sheet before the stretching step is much smaller than the value calculated from the stretch ratio. From this fact it is seen that the resultant film has a multi-cellular, multi-layered structure.

In accordance with the above-mentioned procedures, the intended paper-like thermoplastic synthetic films of this invention can be obtained. When these papers are subjected to the following surface treatments, paper-like films are prepared having a printability comparable to that of a high quality paper such as art paper, particularly an ability to dry an oil ink quickly and conveniently.

As such surface treatments, a method of polarizing the non-polar olefin resin which is the main component of the film is exemplary. Since the film of this invention has a multi-cellular, multi-layered structure, exceedingly excellent results can be attained by these surface treatment methods. As one of such polarizing methods, a method comprising subjecting the film to a flame or heat treatment can be exemplified. In this treatment the film is polarized by contacting the surface of the film having a multi-cellular, multi-layered structure for a short time with a high temperature oxidizing gas flame or a heated air to thereby oxidize the surface of the film and form the C=O linkages and the like. In this treatment it is essential to adjust the time for contacting the film with the flame or heated air so that the shape and multi-cellular, multi-layered structure of the film will not be destroyed. Preferably, the treatment is carried out at 1000° C. to 3000° C. for a very short time.

Secondly, a method of polarizing the surface of the film having a multi-cellular, multi-layered structure by an electric treatment such as a corona discharge treatment, a contact discharge treatment and a spark discharge treatment may be cited. The corona discharge treatment method comprises ionizing the air between the film and an electrode to form ozone and oxidizing the film surface with the so-formed ozone. In this case, the multi-cellular, multi-layered structure of the film is easily destroyed. Therefore, sufficient care must be taken in adjusting the distance between the film and the electrode, the electric voltage, the frequency and the treating time. The contact discharge treatment method comprises contacting the film with an electrode roll and a guide drum and electrically charging the film in the negative and the electrode roll in the positive. Preferably, the treatment is carried out at a treating speed of 30 to 80 m./min. with the use of an alternating current of 1000 to 3000 volts and a frequency of 500 to 2000 c.p.s. The spark discharge treatment is performed by impressing electrodes with an electrical voltage of about 200,000 volts, and generating sparks therebetween while passing the film to be treated therebetween. Generally, the generation of sparks is conducted about 1000 times at a frequency of 50 to 60 c.p.s. at each cycle.

Thirdly, an oxidizing treatment method comprising contacting an oxidizing reactive liquid and the surface of the film having a multi-cellular, multi-layered structure to thereby oxidize the film surface may be used. As the oxidizing reactive liquid, an aqueous solution of a salt of sulfuric acid, chromic acid, dichromic acid, permanganic acid or the like may be used. The contacting time is generally in the range of from 5 seconds to 30 minutes, though it varies to some extent depending on the contacting temperature. When the contacting temperature is higher than 50° C., the contacting may be performed for a period of time shorter than 5 seconds.

Fourthly, a method comprising irradiating high energy radial rays onto the film having a multi-cellular, multi-layered structure to form C=O, $OHR_1CH=CHR_2$ linkage may be cited. It is particularly preferred to irradiate Co-60 γ-rays of 1 to 10 mrad.

Fifthly, an ultraviolet ray treatment method comprising oxidizing the surface of the film having a multi-cellular, multi-layered structure with the use of an ultraviolet ray lamp generating ultraviolet rays having a wavelength ranging from 400 to 200 mμ may be employed. The range of effective wavelengths is different depending on the composition of the film. Accordingly, it is necessary to determine the wavelength and the irradiation time according to the composition of the film.

Sixthly, a chemical treatment method which comprises chlorinating or chlorosulfonating the surface of the film having a multi-cellular, multi-layered structure by chlorine or chlorosulfone may be employed. This treatment may be conducted in a gas or solvent in the presence of a catalyst or light.

The ink-fixing property of the film having a multi-cellular, multi-layered structure can be improved by applying or impregnating a resin having a polarity to the film surface. Since the structure of the film of this invention is highly multi-cellular and multi-layered as compared with ordinary thermoplastic synthetic resin films, this method is conveniently applied to the film of this invention because the applied or impregnated resin is tightly fixed onto the film surface. As such resin having a polarity, polyvinyl acetate, a vinyl acetate-ethylene copolymer, a vinyl acetate-acrylic acid ester copolymer, polyvinyl chloride, polystyrene, a polymer of a methacrylic acid ester, a polymer of an acrylic acid ester, polyacrylonitrile, a melamine-formaldehyde resin, an epoxy resin, a phenol resin, a urea resin, a styrene-butadiene rubber, an acrylonitrile butadiene rubber, methyl cellulose, ethyl cellulose, starch, gelatine, casein and the like are preferably used. Such resins are used in forms of solutions in solvents or aqueous dispersions. They may be used also in the heated and molten state. Thermosettable resins are applied onto the film surface as they are, in the presence of a catalyst, a curing agent, light, ultra-violet rays or radial rays, and in this way, films of such resins are formed on the surface of the film having a multi-cellular, multi-layered structure. It is also possible to apply monomers capable of forming such resins directly on the surface of the film and polymerize the monomers with the use of a catalyst or the like to thereby form a resin film on the surface of the film having a multi-cellular, multi-layered structure. Various additives such as organic and inorganic fillers, pigments, stabilizers, dispersing agents, viscosity-increasing agents, foam extinguishers, antistatic agents, plasticizers, antioxidants and ultra-violet ray absorbents may be incorporated into the above-mentioned types of liquids to be coated on the film surface. It is preferred to conduct the above treatment in a manner such that the multi-cellular, multi-layered structure of the film will not be lost by the intrusion of such resins into the multi-cellular, multi-layered structure.

The ink-drying property and ink-acceptability of the surface of the film having a multi-cellular, multi-layered structure can be improved by treating the film surface with a solvent capable of dissolving or swelling an olefin resin and then removing the solvent. Aliphatic solvents, aromatic solvents, halogenated hydrocarbons and the like may be used as such solvents. Particularly preferable results are attained by the use of toluene, xylene, perchloroethylene, trichloroethylene and tetrachloroethylene. This solvent may be either a solvent or a non-solvent for the film-constituting additive resin such as a styrene resin. In case the solvent has a poor ability of dissolving the olefin resin, the raising of the treating temperature results in good effects. However, the use of a solvent having such a high dissolving ability as will destroy the multi-cellular, multi-layered structure of the film, should be avoided. It is also possible to dissolve the above-mentioned various types of resins in this solvent and thereby fix such resins on the film surface, and good results are obtained by this method. It is also possible to disperse an inorganic filler into this solvent and thereby fix the filler on the film surface effectively. The removal of the solvent is carried out by air drying, heating, evaporation or washing with a non-solvent for an olefin resin, which is compatible with the solvent. In case the removal of the solvent is performed by air drying or heating evaporation, the multi-cellular, multi-layered structure of the film is further improved, resulting in a film of a finer structure. Further, when the film surface is dissolved or swelled with such solvent and the solvent is removed by washing with a non-solvent for an olefin resin, which is compatible with the solvent, the resin dissolved or swelled with the solvent is as if in the state precipitated on the film surface. As a result, the multi-cellular, multi-layered structure of the film becomes much finer than before the treatment, and a particularly preferable paper-like film can be obtained. When the above surface treatment is applied to ordinary thermoplastic synthetic resins, generally the attained effects are not durable. However, in this invention, since this treatment is conducted on a film having a multi-cellular, multi-layered structure, effects of increasing the fineness of the multi-cellular structure and forming a finer multi-cellular, multi-layered structure are sufficiently durable.

Also, a method of promoting the fineness of the multi-cellular, multi-layered structure of the film of this invention by contacting a liquid which is a non-solvent for an olefin resin but a solvent for an additive resin such as a styrene resin, with the surface of the film to thereby elute a part of the additive resin may be conducted. In this case, the elution speed is much higher as compared with the case of ordinary films, because the film to be used in this invention has a multi-cellular, multi-layered structure. The higher the treatment temperature, the higher becomes the elution speed.

Still further, it is possible to improve printability of the film of this invention by a method comprising applying finely divided powder of an inorganic filler onto the surface of the film having a multi-cellular, multi-layered structure. The same fillers as contained in the film are used as such inorganic filler. Such filler may be applied on the film surface by rubbing filler powder preheated at a temperature capable of melting the film-constituting olefin resin into the surface layer of the film, heat-compressing the film by means of a heating roll or a super calender and thus fixing fine powder of the inorganic filler on the film surface. Fine powder of such inorganic filler may also be fixed on the film surface by wetting the filler with a solvent for the olefin resin, dispersing the wetted filler on the film surface and heat-compressing the filler dispersed film in a manner as described above. Since the film of the present invention has a multi-cellular, multi-layered structure, fine powder of such inorganic filler can be a tightly fixed on the film surface. Therefore, excellent results can be obtained by the above treatments. Still further, a method of tightly fixing fine powder of such inorganic filler on the film surface with the use of a binder is available. According to this method, a part of the binder is intruded into the multi-cellular, multi-layered structure of the film. Therefore, in the film of this invention fine powder of an inorganic filler can be fixed much more tightly on the film surface as compared with the case of bonding fine powder of an inorganic filler to ordinary films by employing a binder.

Furthermore, the ink-drying property of the paper-like film can be improved by subjecting the film having a multi-cellular, multi-layered structure to an impregnating treatment with an ink-drying promoter. As such promoter, substances having an ability of promoting an oxidation polymerization of an oil ink, such as cobalt naphthenate and lead naphthenate may be used.

Two or more of the above-described surface treatments may be conducted in combination.

Since the film obtained in accordance with this invention has the above-mentioned specific composition and has been biaxially stretched under specific conditions, it has a multi-cellular, multi-layered structure, and is white and non-transparent, and excellent in printability and graphic properties. Furthermore, the paper-like film of this invention has physical properties quite similar to those of pulp paper. When the above paper-like film having a multi-cellular, multi-layer structure is subjected to the above-described surface treatments, the ink-drying property and other properties can be highly improved, and because of such improved properties as well as the multi-cellular, multi-layerd structure a far more suitable paper-like film is obtained. Still further, the preparation of the paper-like film can be conducted very easily inexpensively according to this invention, and the resultant paper-like film of this invention has excellent water proofness, moisture proofness, chemical resistance, flame resistance and weatherability which conventional pulp paper does not possess.

Thus the paper-like film obtained in accordance with this invention has a wide range of application, such as news print, art paper, high quality printing paper, normal writing paper, tracing paper, photographic paper, tissue paper, cardboard, sliding-door paper, wrapping paper, etc., as a substitute of pulp paper. Further, the paper-like film of this invention whose structure is rendered prominently multi-cellular and multi-layered can be used as packing material, wall material, roofing material, etc., owing to its excellent cushioning property. Still further, because of the multi-cellular, multi-layered structure the paper-like film of this invention is provided with excellent air-permeability, moisture-permeability and cushioning property. Therefore, it can be used for the preparation of synthetic leathers, clothes, medical tapes and bandages, etc.

Hereinafter the invention will be explained with reference to the working examples, in which parts are by weight unless otherwise indicated. The "orientation ratio" referred to in the examples is measured as follows:

Two 100-mm. long lines crossing each other at the center are written on the surface of stretched film, and the film is immersed in liquid glycerine or blowable liquid paraffine and heated to approximately 150–170° C. until no further shrinkage takes place. Therefore the length of the two lines on the film are measured. The orientation ratio is given by the calculation of $$\frac{100}{a} \times \frac{100}{b}$$

when "a" denotes the length of vertical line and "b," that of the horizontal line, expressed in mm.

EXAMPLE 1

Recipe

| | Parts |
|---|---|
| High density polyethylene (Mitsui Kagaku Kogyo Kabushiki Kaisha, "Hizex 6100P") | 100 |
| Ethylene-vinyl acetate copolymer (Mitsui Polychemical Kabushiki Kaisha, "Elnax 150") | 10 |
| Polystyrene (Asahi Dow Kabushiki Kaisha, "Styron 666") | 10 |
| Diatomaceous earth (Johns Manville Sales Corp., "Olite 212") | 30 |
| Titanium oxide (Ishihara Sangyo Kabushiki Kaisha, "Tipaque R–680") | 5 |
| Calcium carbonate (Shiraishi Kogyo Kabushiki Kaisha, "Hakuenka CC–R") | 10 |

A composition of the above recipe was mixed, kneaded at 170° C. for 15 minutes by means of a mixing roll, and ground. The composition was extruded through a flat metal die having an open clearance of 1 mm. in thickness and advanced to an extruder, in which the temperature of the metal die head was maintained at 180° C. The resultant sheet of 300 mm. in width was cooled to room temperature and heated again until the surface temperature became 130° C. which temperature was maintained for 5 minutes. Then, the sheet was stretched coincidentially biaxially at a stretching speed of 80 cm./min., and the stretching was stopped when the orientation ratio reached about 9. Thus, a white, non-transparent film of 0.15 mm. in thickness was obtained. The resultant paper-like film had very smooth surfaces, and exhibited a much higher tensile strength than art paper. Writing with an ordinary water-color ink was performed very well on the film surface. The film also exhibited excellent water resistance and chemical resistance, and resembled art paper.

EXAMPLE 2

Recipe

| | Parts |
|---|---|
| High density polyethylene (Mitsui Kagaku Kogyo Kabushiki Kaisha, "Hizex 6100P") | 100 |
| Ethylene-vinyl acetate copolymer (Nippon Polychemical Kabushiki Kaisha, "Ultrathene UE 634") | 10 |
| Acetal resin (E. I. du Ponte de Nemours & Co. "Delrin") | 10 |
| Titanium oxide (Ishihara Sangyo Kabushiki Kaisha, "Tipaque R–680") | 5 |
| Zinc sulfide-barium sulfate mixture (Kakai Kagaku Kogyo Kabushiki Kaisha, "Litopone") | 10 |
| Diatomaceous earth (Johns Manville Sales Corp., "Cellite 212") | 40 |
| Calcium carbonate (Shiraishi Kogyo Kabushiki Kaisha, "Hakuenka CC–R") | 10 |
| Stabilizer (di-butyltin-dimaleate) | 0.3 |

A composition of the above recipe was mixed, kneaded at 170° C. for 15 minutes, and ground and extruded through an extruder in which the temperature of the metal die head was maintained at 180° C. The resultant sheet of 1.5 mm. in thickness was compressed at 150° C. under a pressure of 100 kg./cm.² for 15 minutes by means of a pressing machine. A sheet of 1.2 mm. in thickness and 100 mm. in length and width was obtained. The sheet was maintained at a temperature of 125° C. for 5 minutes, and then stretched biaxially at the same temperature at a stretching speed of 60 cm./min. to obtain a film having an orientation ratio of about 9, the sheet being 0.5 mm. thick, 300 mm. long and 300 mm. broad. The film was white and non-transparent, and had smooth surfaces. The film was excellent in toughness. The film had a structure of a plurality of very thin layers, and the microscopic observation proved that each thin layer had a multi-cellular structure.

EXAMPLE 3

Recipe

| | Parts |
|---|---|
| High density polyethylene (Mitsui Kagaku Kogyo Kabushiki Kaisha, "Hizex 3300F") | 100 |
| Ethylene-acrylic acid ionomer (Mitsui Polychemical Kabushiki Kaisha, "Surlyn A 1601") | 10 |
| Polystyrene (Kekisui Kagaku Kogyo Kabushiki Kaisha, "Polystyrol MF–30") | 10 |
| Zinc sulfide-barium sulfate mixture (Sakai Kagaku Kogyo Kabushiki Kaisha, "Litopone") | 10 |
| Diatomaceous earth (Johns Manville Sales Corp., "Celite 212") | 30 |
| Clay (Hayashi Kasei Kabushiki Kaisha, "Asp-200") | 10 |

A composition of the above recipe was mixed and kneaded at 170° C. for 15 minutes by a mixing roll and shaped into a sheet 500 mm. wide and 0.5 mm. thick by means of a calender roll. The sheet was cooled once and reheated. The sheet was maintained at 115° C. for 8 minutes, and then shaped into a film of 0.1 mm. in thickness having an orientation ratio of about 9 by stretching the sheet coincidentally biaxially at a stretching speed of 40 cm./mm. The resultant film had smooth and lustrous surfaces, and was superior to art paper and high quality paper with respect to break strength and water resistance.

EXAMPLE 4

Recipe

| | Parts |
|---|---|
| High density polyethylene (Mitsui Kagaku Kogyo Kabushiki Kaisha, "Hizex 6100P") | 100 |
| Ethylene-acrylic acid ionomer (Mitsui Polychemical Kabushiki Kaisha, "Surlyn A 1601") | 5 |
| Ethylene-vinyl acetate copolymer (Nippon Polychemical Kabushiki Kaisha, "Ultrathene UE 634") | 5 |
| Acrylonitrile-styrene copolymer (Osahi Dow Kabushiki Kaisha, "Tyril 767") | 10 |
| Titanium oxide (Ishihara Sangyo Kabushiki Kaisha, "Tipaque R–680") | 5 |
| Zinc sulfide-barium sulfate mixture (Sakai Kagaku Kogyo Kabushiki Kaisha, "Litopone") | 5 |
| Diatomaceous earth (Johns Manville Sales Corp., "Celite 212") | 50 |
| Plasticizer (di-2-ethylhexyl phthalate) | 15 |
| Stabilizer (tribasic lead sulfate) | 5 |
| Lubricant (methylene bis-stearoamide) | 0.3 |

Among the above components, the acrylonitrile-styrene copolymer was sufficiently impregnated with the plasticizer before mixing. Then, the above components were mixed and kneaded at 175° C. for 30 minutes by a mixing roll, and extrusion molded through a flat metal die into a sheet of 0.5 mm. in thickness and 300 mm. in width. Immediately, the sheet was cooled and then heated again so that the surface temperature was maintained at 135° C. for 3 minutes. Thus, the sheet was stretched coincidentally biaxially at a stretching speed of 150 cm./min. to form a film of 0.05 mm. in thickness and 950 mm. in width having an orientation ratio of about 12. The resultant film had smooth and lustrous surfaces and was excellent in flexibility. The film resembled tissue paper. A water-color ink soaked into the film quite well. This film was quite useful as a substitute for paper.

EXAMPLE 5

Recipe

| | Parts |
|---|---|
| High density polyethylene (Mitsui Kagaku Kogyo Kabushiki Kaishta, "Hizex 6100P") | 100 |
| Ethylene-ethyl acrylate copolymer (Dow Chemical Co., Ltd., "Zetafin 30") | 15 |
| Polyvinyl acetate (Sekisui Kagaku Kogyo Kabushiki Kaisha, "S-nyl P-40") | 15 |
| Vinyl chloride-vinyl acetate (Sekisui Kagaku Kogyo Kabushiki Kaisha, "S-lec C") | 5 |
| Titanium oxide (Ishihara Sangyo Kabushiki Kaisha, "Tipaque R-820") | 5 |
| Zinc sulfide-barium sulfate mixture (Kakai Kagaku Kogyo Kabushiki Kaisha, "Litopone") | 10 |
| Diatomaceous earth (Johns Manville Sales Corp., "Celite 212") | 30 |
| Talc (Hayashi Kasei Kabushiki Kaisha, "Micronwhite") | 15 |
| Stabilizer (di-butyltin dimaleate) | 0.5 |
| Plasticizer (di-2-ethylhexyl phthalate) | 5.5 |
| Ultra-violet ray absorbent (2-hydroxy-phenylbenzotriazole) | 0.5 |

Among the above components, the vinyl chloride-vinyl acetate was sufficiently impregnated with the plasticizer. Then, the above components were mixed and kneaded at 165° C. for 30 minutes by means of a mixing roll, and extrusion molded through a flat metal die into a sheet 0.75 mm. thick and 300 mm. wide. Immediately, the sheet was cooled to room temperature and heated again so that the surface temperature was maintained at 130° C. for 3 minutes. Then, the sheet was biaxially stretched at a stretching speed of 80 cm./min. to obtain a film of 0.15 mm. in thickness and 550 mm. in width having an orientation ratio of about 5.5. The resultant film had a multi-cellular, multi-layered structure and resembled art paper and high quality paper.

EXAMPLE 6

Recipe

| | Parts |
|---|---|
| Medium density polyethylene (Showa Yuka Kabushiki Kaisha, "Showlex 5008") | 100 |
| Ethylene-vinyl acetate copolymer (Nippon Polychemical Kabushiki Kaisha, "Ultrathene UE 634") | 10 |
| High impact polystyrene (Asahi Dow Kabushiki Kaisha, "Styron 475") | 10 |
| Titanium oxide (Ishihara Sangyo Kabushiki Kaisha, "Tipaque R-680") | 3 |
| Zinc sulfide-barium sulfate mixture (Sakai Kagaku Kogyo Kabushiki Kaisha, "Litopone") | 10 |
| Diatomaceous earth (Johns Manville Sales Corp., "Celite 212") | 400 |

A composition of the above recipe was mixed and kneaded at 165° C. for 15 minutes by means of a mixing roll and extrusion molded into a 2.0 mm. thick sheet by an extruder. The sheet was compressed at 140° C. under a pressure of 70 kg./cm.² for 10 minutes to obtain a sheet of 1.0 mm. in thickness. The sheet was cooled once and then heated so that the surface temperature was maintained at 120° C. for 5 minutes, and then stretched biaxially at a stretching speed of 50 cm./min. to form a 1.5 mm. thick film having an orientation ratio of about 6. The resultant film had a multi-cellular, multi-layered structure, and smooth and lustrous surfaces. The film exhibited a leather-like touch and was conveniently used as articles requiring water resistance such as carpetings and coatings.

EXAMPLE 7

Recipe

| | Parts |
|---|---|
| High density polyethylene (Mitusi Kagaku Kogyo Kabushiki Kaisha, "Hizex 6100P") | 100 |
| Ethylene-vinyl acetate copolymer (Nippon Polychemical Kabushiki Kaisha, "Ultrathene UE 634") | 10 |
| Polystyrene (Sekisui Kagaku Kogyo Kabushiki Kaisha, "Polystyrol SS 800M") | 15 |
| Methyl methacrylate-styrene copolymer (Mitsubishi Rayon Kabushiki Kaisha, "Diapet") | 5 |
| Titanium oxide (Ishihara Sangyo Kabushiki Kaisha, "Tipaque R-680") | 5 |
| Diatomaceous earth (Johns Manville Sales Corp., "Celite 212") | 50 |
| Calcium carbonate (Shiraishi Kogyo Kabushiki Kaisha, "Hakuenka CC-R") | 15 |
| Plasticizer (di-2-ethylhexyl phthalate) | 20 |
| Lubricant (methylene bis-stearoamide) | 0.5 |

Among the above components, the polystyrene and methyl methacrylate-styrene copolymer were sufficiently impregnated with the plasticizer before mixing. Then, the above components were mixed and kneaded at 165° C. for 20 minutes and extrusion molded through a flat metal die into a sheet 1.5 mm. thick and 300 mm. wide. Immediately, the sheet was cooled and then heated again so that the surface temperature was maintained at 135° C. for 3 minutes. Thereafter, the sheet was stretched biaxially at a stretching speed of 150 cm./min. to form a 0.2 mm. thick film having an orientation ratio of about 12. The resultant film had smooth surfaces and a multi-cellular, multi-layered structure. The film was very flexible and exhibited good graphical properties and printability. The film was conveniently used as wrapping paper, packing paper and poster paper.

EXAMPLE 8

Recipe

| | Parts |
|---|---|
| High density polyethylene (Mitsui Kagaku Kokyo Kabushiki Kaisha, "Hizex 6100P") | 100 |
| Ethylene-vinyl acetate copolymer (Mitsui Polychemical Kabushiki Kaisha, "Elvax 250") | 10 |
| Phenoxy resin (Union Carbide Corporation, "PRDA8060") | 10 |
| Titanium oxide (Ishihara Sangyo Kabushiki Kaisha, "Tipaque R-680") | 5 |
| Diatomaceous earth (Johns Manville Sales Corp., "Celite 212") | 40 |
| Clay (Hayashi Kasei Kabushiki Kaisha, "Asp-200") | 10 |

A composition of the above recipe was mixed and kneaded at 170° C. for 15 minutes by means of a mixing roll and extrusion molded through a flat metal die to form a sheet 1.0 mm. thick and 300 mm. wide. Immediately, the resultant sheet was cooled to room temperature and then heated again so that the surface temperature was maintained at 130° C. for 3 minutes. Thereafter, the sheet was stretched biaxially at a stretching speed of 120 cm./min. to obtain a film of 0.1 mm. in thickness having an orientation ratio of about 12. The resultant film had smooth surfaces and a multi-cellular, multi-layered structure. The film was very soft and flexible, and exhibited good graphical properties and printability. The film was a good substitute for pulp paper.

EXAMPLE 10

Recipe

| | Parts |
|---|---|
| Polypropylene (Chisso Kabushiki Kaisha, "Chisso Polypro 1014") | 100 |
| Acetatic polypropylene (Chisso Kabushiki Kaisha, "Vistac CC") | 30 |
| Ethylene-vinyl acetate copolymer (Nippon Polychemical Kabushiki Kaisha, "Ultrathene UE 634") | 15 |
| Phenoxy resin (Union Carbide Corporation, "PRDA 8060") | 20 |
| Diatomaceous earth (Johns Manville Sales, Corp., "Celite 212") | 40 |
| Titianium oxide (Ishihara Sangyo Kabushiki Kaisha, "Tipaque R-680") | 3 |
| Stabilizer (tribasic lead sulfate) | 1 |
| Ultra-violet ray absorbent (2-hydroxy-phenylbenzotriazole) | 0.2 |

A composition of the above recipe was melt mixed and kneaded at 185–190° C., and extruded through a flat die where the metal die head was maintained at 200° C. to obtain a sheet of 0.25 mm. in thickness and 300 mm. in width. The resultant sheet was cooled once and then heated again. The sheet was stretched coincidentally biaxilly at 155° C. at a stretching speed of 80 cm./min., each of the draw ratios in the longitudinal and lateral directions being about 1.5. A 0.1 mm. thick film having smooth surfaces and a slightly multi-cellular, multi-layered structure was obtained. The film resembled art paper and exhibited a tensile strength 1.5 times as high as that of art paper.

EXAMPLE 11

Recipe

| | Parts |
|---|---|
| Polypropylene (Chisso Kabushiki Kaisha, "Chisso Polypro 1014") | 85 |
| Propylene oxide rubber (Tokuyama Soda Kabushiki Kaisha, "POR P-700") | 15 |
| Chlorinated polyethylene (Showa Denko Kabushiki Kaisha, "Elathlene 301A") | 15 |
| Ethylene-vinyl acetate copolymer (Nippon Polychemical Kabushiki Kaisha, "Ultrathene UE 750") | 20 |
| Polystyrene (Sekisui Kagaku Kogyo Kabushiki Kaisha, "polystyrol SS-800M") | 15 |
| Diatomaceous earth (Johns Manville Sales Corp., "Celite 212") | 40 |
| Talc (Nippon Talc Kabushiki Kaisha, "LM-R") | 15 |
| Titanium oxide (Ishihara Sangyo Kabushiki Kaisha, "Tipaque R-680") | 2 |

A composition of the above recipe was melt mixed and kneaded at 190–195° C., and extruded into a sheet through a flat metal die, the head of which was maintained at 220° C. The resultant sheet was quenched and then stretched biaxially at 155° C. at a stretching speed of 120 cm./min., each of the stretching ratios in the longitudinal and lateral directions being about 3. The resultant film had a thickness of 0.3 mm., and frosted smooth surfaces. The film was excellent in flexibility and had a leatherlike touch. The film was conveniently used as leather, coating and packing material on which printing was possible.

EXAMPLE 12

Recipe

| | Parts |
|---|---|
| Polypropylene (Chisso Kabushiki Kaisha, "Chisso Polypro 1014") | 70 |
| Atactic polypropylene (Chisso Kabushiki Kaish, "Vistac CC") | 30 |
| Ethylene-acrylic acid ionomer (Mitsui Polychemical Kabushiki Kaisha, "Surlyn A1601") | 15 |
| Acetal resin (E. I. du Pont de Nemours & Co. "Delrin") | 5 |
| Methyl methacrylate-styrene copolymer (Mitsubishi Rayon Kabushiki Kaisha, "Diapet") | 5 |
| Diatomaceous earth (Johns Manville Sales Corp., "Celite 212") | 45 |
| Clay (Hayashi Kasei Kabushiki Kaisha, "Asp-200") | 15 |
| Titanium oxide (Ishihara Sangyo Kabushiki Kaisha, "Tipaque R-680") | 3 |
| Antioxidant (Yoshitomi Seiyaku Kogyo Kabushiki Kaisha, "BHT Swanox") | 0.5 |

A composition of the above recipe was melt mixed and kneaded at 190–195° C., and then extruded through a flat metal die, the head of which was maintained at 200° C., to obtain a sheet 0.5 mm. thick and 300 mm. wide. The sheet was stretched biaxially at 150° C. at a stretching speed of 100 cm./min., each of the stretching ratios in the longitudinal and lateral directions being about 2.5. The resultant film had a thickness of 0.1 mm. and had a multi-cellular, multi-layered structure, and frosted smooth surfaces. The film exhibited excellent graphic properties and printability, and was conveniently used as poster paper, calender paper, sticker and wrapping paper.

EXAMPLE 13

Recipe

| | Parts |
|---|---|
| Polypropylene (Chisso Kabushiki Kaisha, "Chisso Polypro 1014") | 80 |
| Ethylene-ethyl acrylate copolymer (Dow Chemical Co., Ltd., "Zetafin 30") | 10 |
| Lowly polymeric polystyrene (Esso Standard Oil Co., Ltd., "Picolastic D-100") | 10 |
| Chlorinated polyethylene (Showa Denko Kabushiki Kaisha, "Elathlene 301A") | 5 |
| Diatomaceous earth (Johns Manville Sales Corp., "Celite 212") | 45 |
| Titanium oxide (Ishihara Sangyo Kabushiki Kaisha, "Tipaque R-680") | 2 |
| Stabilizer (di-butyltin dimaleate) | 0.5 |

A composition of the above receipe was melt mixed and kneaded at 185–190° C. and extruded through a flat metal die, the head of which was maintained at 195° C., to obtain a sheet of 1.0 mm. in thickness and 300 mm. in width. Then, the sheet was heated and maintained at 140° C. for 5 minutes. Thereafter, the sheet was biaxially stretched at 155° C. at a stretching speed of 80 cm./min. to form a 0.11 mm. thick film having an orientation ratio of about 9. The film had a multi-celluar, multi-layered structure and exhibited good graphic properties and printability. Further, the film was excellent in water resistance, chemical resistance, weatherability and mechanical strengths. The film was an excellent substitute for pulp paper.

EXAMPLE 14

Recipe

| | Parts |
|---|---|
| Polypropylene (Chisso Kabushiki Kaisha, "Chisso Polypro 1014") | 90 |
| Atactic polypropylene (Chisso Kabushiki Kaisha, "Vistac CC") | 10 |
| Eethylene-vinyl acetate copolymer (Nippon Polychemical Kabushiki Kaisha, "Ultrathene UE 750") | 10 |
| Styrene-butadiene rubber (Nippon Gosei Gomu Kabushiki Kaisha, "JSR 1502") | 10 |
| Polystyrene (Sekisui Kagaku Kogyo Kabushiki Kaisha, "Polystyrol MF–30") | 10 |
| Low density polyethylene (Sumitomo Kagaku Kogyo Kabushiki Kaisha, "Sumikathene G201") | 7.5 |
| Diatomaceous earth (Johns Manville Sales Corp., "Celite 212") | 5 |
| Titanium oxide (Ishihara Sangyo Kabushiki Kaisha, "Tipaque R–680") | 5 |

A composition of the above recipe was homogeneously melt mixed and kneaded, and extruded through a flat metal die, the head of which was maintained at 200–205° C., followed by quenching. A sheet 0.5 mm. thick and 300 mm. wide was obtained. The sheet was maintained at a temperature of 160° C. for 8 minutes and biaxially stretched at a stretching speed of 80 cm./min. to obtain a 0.15 mm. thick film having an orientation ratio of about 4. The structure of the film was slightly multi-cellular and multi-layered. The film was soft and flexible, and had smooth and slightly lustrous surfaces. The film was suitably used as a poster and sticker.

EXAMPLE 15

Recipe

| | Parts |
|---|---|
| Polypropylene (Chisso Kabushiki Kaisha, "Chisso Polypro 1014") | 80 |
| Propylene oxide rubber (Tokuyama Soda Kabushiki Kaisha, "POR P–007") | 20 |
| Ethylene-acrylic acid ionomer (Mitsui Polychemical Kabushiki Kaisha, "Surlyn A1601") | 15 |
| Polyvinyl chloride (Nippon Carbide Kabushiki Kaisha, "Nicavinyl MF–800") | 5 |
| Diatomaceous earth (Johns Manville Sales Corp., "Celite 212") | 40 |
| Calcium carbonate (Shiraishi Kogyo Kabushiki Kaisha, "Hakuenka CC–R") | 15 |
| Plasticizer (di-2-ethylhexyl phthalate) | 7.5 |
| Stabilizer (tribasic lead sulfate) | 3 |
| Stabilizer (lead stearate) | 2 |

A composition of the above recipe was homogeneously melt mixed and kneaded, and extruded through a flat metal die, the head of which was maintained at 200° C. The extrudate was stretched in the axial direction at a speed 3 times as high as the extrusion rate to obtain a sheet of 200 mm. in width and 0.3 mm. in thickness. The sheet was maintained at 160° C. for 3 minutes and the stretched biaxially at 165° C. to obtain a 0.08 mm. thick film having an orientation ratio of about 6. The resultant film had a multi-cellular, multi-layered structure, and smooth and frosted surfaces. The film was soft and flexible.

EXAMPLE 16

Recipe

| | Parts |
|---|---|
| Polypropylene (Chisso Kabushiki Kaisha, "Chisso Polypro 1014") | 100 |
| Atactic polypropylene (Chisso Kabushiki Kaisha, "Vistac CC") | 15 |
| Ethylene-vinyl acetate copolymer (Mitsui Polychemical Kabushiki Kaisha, Elvax 150") | 10 |
| Polyvinyl acetate (Sekisui Kagaku Kogyo Kabushiki Kaisha, "S-nyl P–42") | 15 |
| Amide resin (Toyo Rayon Kabushiki Kaisha, "Amilan CM 4001") | 5 |
| Diatomaceous earth (Johns Manville Sales Corp. "Celite 212") | 40 |
| Talc (Nippon Talc Kabushiki Kaisha, "LM") | 20 |
| Titanium oxide (Ishihara Sangyo Kabushiki Kaisha, "Tipaque R–680") | 3 |

A composition of the above recipe was homogeneously melt mixed and kneaded, and extruded through a metal die, the head of which was maintained at 235° C., followed by quenching. A sheet of 0.8 mm. in thickness and 300 mm. in width was obtained. Then, the sheet was stretched biaxially at a temperature of 148° C., the stretch ratio in the longitudinal direction being about 6.5 and that in the lateral direction being about 2. A. 0.1 mm. thick film having a multi-cellular, multi-layered structure was obtained. The film had smooth and slightly lustrous surfaces, and exhibited good graphic properties and printability.

EXAMPLE 17

Recipe

| | Parts |
|---|---|
| Polypropylene (Chisso Kabushiki Kaisha, "Chisso Polypro 1014") | 80 |
| Atactic polypropylene (Chisso Kabushiki Kaisha, "Vistac CC") | 20 |
| Ethylene-vinyl acetate copolymer (Nippon Polychemical Kabushiki Kaisha, "Ultrathene UE 634") | 10 |
| Phenoxy resin (Union Carbide Corp., "PRDA8060") | 15 |
| Asbestos powder (Hayashi Kasei Kabushiki Kaisha) | 25 |
| Mica powder (Shiraishi Kogyo Kabushiki Kaisha) | 15 |
| Titanium oxide (Ishihara Sangyo Kabushiki Kaisha, "Tipaque R–680") | 5 |

A composition of the above recipe was homogeneously melt mixed and kneaded, and extruded into a sheet through a metal die, the head of which was maintained at 200° C., followed by gradual cooling. Then the sheet was heated again and stretched coincidentally biaxially at 150° C. at a stretching speed of 100 cm./min. to obtain a 0.3 mm. thick film having an orientation ratio of about 8. The resultant film had a multi-cellular, multi-layered structure and was rich in flexibility.

EXAMPLE 18

Recipe

| | Parts |
|---|---|
| Polypropylene (Chisso Kabushiki, Kaisha, "Chisso Polypro 1014") | 50 |
| Propylene oxide rubber (Tokuyama Soda Kabushiki Kaisha, "POR P–007") | 30 |
| High density polyethylene (Mitsui Kagaku Kogyo Kabushiki Kaisha, "Hizex 6100P") | 20 |
| Amide resin (Toyo Rayon Kabushiki Kaisha, "Amilan CM4001") | 15 |
| Mica powder (Shiraishi Kogyo Kabushiki Kaisha) | 15 |
| Asbestos powder (Hayashi Kasei Kabushiki Kaisha) | 15 |
| White carbon (Shionogi Seiyaku Kabushiki Kaisha, "Carplex 80") | 15 |
| Titanium oxide (Ishihara Sangyo Kabushiki Kaisha, "Tipaque R–820") | 2.5 |

A composition of the above recipe was melt mixed, kneaded and extruded through a flat metal die, the head of which was maintained at 230° C., followed by quenching. A sheet 0.5 mm. thick and 300 mm. wide was obtained. The sheet was stretched at 160° C. at a stretching speed of 200 cm./min. first in the longitudinal direction at a stretch ratio of about 3 and then in the lateral direction at a stretch ratio of about 3. A 0.1 mm. thick film having smooth and lustrous surfaces was obtained. The film exhibited good graphic properties and printability.

EXAMPLE 19

Recipe

| | Parts |
|---|---|
| Polybutene-1 (Huls Co., Ltd., "Vestolen BT") | 100 |
| Ethylene-vinyl acetate copolymer (Nippon Polychemical Kabushiki Kaisha, "Ultrathene UE 634") | 15 |
| Polystyrene (Sekisui Kagaku Kogyo Kabushiki Kaisha, "Polystyrol MF-30") | 15 |
| Diatomaceous earth (Johns Manville Sales Corp., "Celite 212") | 30 |
| Titanium oxide (Ishihara Sangyo Kabushiki Kaisha, "Tipaque R-680") | 5 |

A composition of the above recipe was melt mixed and kneaded and shaped into a sheet of 0.6 mm. in thickness and 300 mm. in width by means of a calendar roll, while the sheet surface temperature was being maintained at 115° C., the sheet was stretched coincidentally biaxially at a stretching speed of 100 cm./min. to form a 0.15 mm. thick film having an orientation ratio of about 6. The resultant film was rich in flexibility and slightly lustrous, and had a multi-cellular, multi-layered structure. This film was conveniently used as leather and waterproof coating.

EXAMPLE 20

Recipte

| | Parts |
|---|---|
| Polybutene-1 (Huls Co., Ltd., "Vestolen BT") | 100 |
| Ethylene-acrylic acid ionomer (Mitsui Polychemical Kabushiki Kaisha, "Surlyn A1601") | 10 |
| Low density polyethylene (Sumitomo Kagaku Kogyo Kabushiki Kaisha, "Sumikathene G201") | 10 |
| Phenoxy resin (Union Carbide Corporation, "PRDA8060") | 10 |
| Acrylonitrile-styrene copolymer (Asahi Dow Kabushiki Kaisha, "Tyril 767") | 5 |
| Mica powder (Shiraishi Kogyo Kabushiki Kaisha) | 15 |
| Talc (Hayashi Kasei Kabushiki Kaisha, "Micron White") | 25 |
| Titanium oxide (Ishihara Sangyo Kabushiki Kaisha, "Tipaque R-680") | 3 |
| Ultra-violet ray absorbent (2-hydroxy-phenylbenzotriazole) | 0.3 |
| Lubricant (methylene bis-stearoamide) | 0.3 |

A composition of the above recipe was homogeneously melt mixed and kneaded, and molded into a 0.5 mm. thick and 300 mm. wide sheet by means of a calender roll. The sheet was cooled once, heated again until the surface temperature was raised to 120° C. and stretched biaxially at a stretching speed of 60 cm./min. to obtain a 0.15 mm. thick film having an orientation ratio of abot 5. The resultant film had smooth surfaces and was excellent in graphic properties and printability.

EXAMPLE 21

Recipe

| | Parts |
|---|---|
| Polybutene-1 (Huls Co., Ltd., "Vestolen BT") | 100 |
| Chlorinated polyethylene (Showa Denko Kabushiki Kaisha, "Elathlene 301A") | 15 |
| Medium density polyethylene (Showa Yuka Kabushiki Kaisha, "Showlex 5008") | 5 |
| Amide resin (Toyo Rayon Kabushiki Kaisha, "Amilane CM4001") | 10 |
| Asbestos powder (Hayashi Kasei Kabushiki Kaisha) | 15 |
| Diatomaceous earth (Johns Manville Sales Corp., "Celite 212") | 15 |
| Calcium carbonate (Shiraishi Kogyo Kabushiki Kaisha, "Hakuenka CC-R") | 10 |
| Titanium oxide (Ishihara Sangyo Kabushiki Kaisha, "Tipaque R-680") | 5 |

A composition of the above recipe was homogeneously melt mixed and kneaded, and extruded into a sheet of 0.8 mm. in thickness and 300 mm. in width through a flat metal die, the head of which was maintained at 230° C. The sheet was stretched biaxially at a surface temperature of 125° C. at a stretching speed of 80 cm./min. to obtain a 0.1 mm. thick film having an orientation ratio of about 12. The resultant film had a multi-cellular, multi-layered structure, and smooth and lustrous surfaces. The film was excellent in printability and physical strengths. Because of its excellent water resistance and weatherability, the film was suitable as poster and sticker material.

EXAMPLE 22

Recipe

| | Parts |
|---|---|
| Polybutene-1 (Huls Co., Ltd., "Vestolen BT") | 100 |
| Propylene oxide rubber (Tokuyama Soda Kabushiki Kaisha, "POR P-007") | 10 |
| Acetal resin (E. I. du Pont de Nemours & Co., "Delrin") | 10 |
| Diatomaceous earth (Johns Manville Sales Corp., "Celite 212") | 30 |
| Kaoline (Hayashi Kasei Kabushiki Kaisha, "Asp-600") | 20 |
| White carbon (Shionogi Seiyaku Kabushiki Kaisha "Carplex 80") | 20 |
| Titanium oxide (Ishihara Sangyo Kabushiki Kaisha, "Tipaque R-680") | 5 |
| Antioxidant (Yoshitomi Saiyaku Kogyo Kabushiki Kaisha, "BHT Swanox") | 0.5 |

A composition of the above recipe was homogeneously melt mixed and kneaded, and molded into a sheet of 0.5 mm. in thickness and 300 mm. in width by means of a calender roll. While the temperature of the sheet surface was being maintained at 115° C., the sheet was stretched biaxially at a stretching speed of 60 cm./min. to form a 0.1 mm. thick film having an orientation ratio of about 6. The film had smooth surfaces and was rich in flexibility. The film was conveniently used as a substitute for pulp paper.

EXAMPLE 23

Recipe

| | Parts |
|---|---|
| Polybutene-1 (Huls Co., Ltd., "Vestolen BT") | 100 |
| Ethylene-ethyl acrylate copolymer (Dow Chemical Co., Ltd., "Zetafin 30") | 15 |
| Acrylonitrile - butadiene rubber (Nippon Zeon Kabushiki Kaisha, "Hycar 1014") | 5 |
| Polyvinyl chloride (Nippon Carbide Kabushiki Kaisha, "Nicavinyl") | 10 |
| Talc (Hayashi Kasei Kabushiki Kaisha, "Micron White") | 45 |
| Plasticizer (di-2-ethylhexyl phthalate) | 8 |
| Stabilizer (lead stearate) | 0.5 |
| Stabilizer (tribasic lead sulfate) | 0.5 |
| Antioxidant (Yoshitomi Seiyaku Kogyo Kabushiki Kaisha, "BHT Swanox") | 1 |

A composition of the above recipe was homogeneously melt mixed and kneaded, and molded into a sheet 1.0 mm. thick and 300 mm. wide by means of a calender roll. The sheet was stretched biaxially at 120° C. at a stretching speed of 40 cm./min., the stretch ratio in the longitudinal direction being about 8 and that in the lateral direction being about 2. A film of about 0.1 mm. in thickness having a multi-cellular, multi-layered structure was obtained. The film was soft and flexible, and was suitably used as medical band and tape band.

EXAMPLE 24

Recipe

| | Parts |
|---|---|
| Polybutene-1 (Huls Co., Ltd., "Vestolen BT") | 100 |
| Ethylene-vinyl acetate copolymer (Mitsui Polychemical Kabushiki Kaisha, "Elvax 150") | 10 |
| Styrene-butadiene rubber (Nippon Gosei Gomu Kabushiki Kaisha, "JSR 1502") | 5 |
| Methyl methacrylate-styrene copolymer (Mitsubishi Rayon Kabushiki Kaisha, "Diapet") | 15 |
| Mica powder (Shiraishi Kogyo Kabushiki Kaisha) | 45 |
| Titanium oxide (Ishihara Sangyo Kabushiki Kaisha, "Tipaque R-820") | 5 |

A composition of the above recipe was homogeneously melt mixed and kneaded, and extruded through a flat metal die, the head of which was maintained at 180° C., followed by cooling. A sheet of 1.5 mm. in thickness and 300 mm. in width was obtained. Then, the sheet was heated at 130° C., and stretched at a stretching speed of 100 cm./min. at a longitudinal stretch ratio of about 10 and a lateral stretch of about 5 to form a 0.08 mm. thick film having a multi-cellular, multi-layer structure. The resultant film exhibited good graphic properties and printability, and was suitable as a base tape of an adhesive tape.

EXAMPLE 25

Recipe

| | Parts |
|---|---|
| Polybutene-1 (Huls Co., Ltd., "Vestolen BT") | 100 |
| Ethylene-vinyl acetate copolymer (Nippon Polychemical Kabushiki Kaisha, "Uultarthene UE 634") | 15 |
| High density polyethylene (Mitsui Kagaku Kogyo Kabushiki Kaisha, "Hizex 6100P") | 10 |
| Polyvinyl acetate (Sekisui Kagaku Kogyo Kabushiki Kaisha, "S-nyl P-42") | 15 |
| High impact polystyrene (Asahi Dow Kabushiki Kaisha, "Styron 475") | 10 |
| Diatomaceous earth (Johns-Manville Sales Corp., "Celite 212") | 80 |
| Titanium oxide (Ishihara Sangyo Kabushiki Kaisha, "Tipaque R-680") | 8 |

A composition of the above recipe was homogeneously melt mixed and kneaded, and extruded into a sheet of 0.5 mm. in thickness and 300 mm. in width through a flat metal die, the head of which was maintained at 160° C. Immediately, the sheet was subjected to an action of a stretching machine and biaxially stretched at 125° C. at a stretching speed of 150 cm./min. to obtain a 0.1 mm. thick film having a multi-cellular, multi-layer structure. The resultant film was excellent in printability and was conveniently used as a substitute for pulp paper and as wrapping and packing materials.

EXAMPLE 26

A flame of a bluish white color at about 2000° C. was allowed to be in contact with the surface of the film obtained in Example 1 for 0.5 second. By this surface treatment, the ink-drying property of the film surface, when printed with an oil ink, was improved.

EXAMPLE 27

The film obtained in Example 8 was subjected to a corona discharge surface treatment at a passing speed of 10 m./min. with the distance between the film and electrode being adjusted to 0.06 inch, by employing a corona discharge apparatus where an alternating current of 1000–2000 volt and 20–50 c.p.s. was biased and a high frequency of 1000–4000 volts and 1 kc.–1 mc. was actuated with a certain deviation of phase. The ink-drying and ink-fixing properties of the film when printed with an oil ink, was improved.

EXAMPLE 28

The film obtained in Example 13 was subjected to a contact discharge treatment by electrically charging the film in the negative and an electrode roll in the positive with an alternating current of 2000 volt and 1000 c.p.s. and adjusting the treating speed to 60 m./min. The resultant film exhibited an improved ink-fixing property over the film obtained in Example 13.

EXAMPLE 29

The film obtained in Example 2 was subjected to a spark discharge treatment by passing the film at a speed of 10 m./min. through electrodes on which an electric voltage of 200,000 volts was impressed to thereby generate sparks at 60 c.p.s. The resultant film exhibited an improved ink-fixing property over the untreated film.

EXAMPLE 30

The film obtained in Example 15 was dipped for 30 seconds in a mixed liquor of concentrated sulfuric acid, potassium dichromate and water at a mixing ratio by weight of 100:5:2 maintained at 70° C., followed by water washing and drying. The film which had been subjected to the above oxidizing treatment exhibited improved ink-fixing and ink-drying properties over the untreated film.

EXAMPLE 31

Co-60 $\gamma$-rays were irradiated on the film obtained in Example 18 with an exposure dose of 3.0 mr. at an exposure rate of $6.7 \times 10^4$ $\gamma$/hr. and at a temperature of 30° C. The resultant film exhibited improved ink-fixing and ink-drying properties over the untreated film.

EXAMPLE 32

An ultra-violet ray of 354 m$\mu$ was irradiated at 60° C. for 10 hours on the film obtained in Example 6. The resultant film exhibited an excellent oil ink-fixing property and had the surface strength several times higher than that of art paper.

EXAMPLE 33

The film obtained in Example 5 was subjected to a contact reaction with $SO_2$ and $Cl_2$ at 60–70° C. in carbon tetrachloride in the presence of azobisisobutyronitrile. The resultant film exhibited an improved ink-fixing property and surface strength over the untreated film.

EXAMPLE 34

The film obtained in Example 4 was dipped into ethyl acetate containing 5% by weight of polyvinyl acetate, following by air drying. The resultant film had superior graphic properties with a water-color ink than the untreated film.

EXAMPLE 35

Co-60 $\gamma$-rays were irradiated at an exposure rate of $10^4$–$10^5$ $\gamma$/hr. on the film obtained in Example 2 in the presence of a vinyl chloride gas to thereby graft polymerize vinyl chloride on the film surface. The resultant film exhibited an excellent ink-drying property and surface strength and had leather-like appearance and touch.

EXAMPLE 36

The surface of the film obtained in Example 10 was coated with a styrene monomer containing a small amount of benzoyl peroxide at a ratio of 5 g./m.², and heated at 80–100° C. for one hour and then at 150° C. for one hour.

The resultant film had an excellent ink-fixing property and had improved surface strength and bending resistance.

EXAMPLE 37

A mixed solvent of trichloroethylene and methanol at a mixing ratio by weight of 8:2 was coated on the surface of the film obtained in Example 1, followed by drying with air heated at 80° C. The resultant film had an excellent ink-fixing property.

EXAMPLE 38

A sheet prepared in a similar manner as in Example 16 was stretched biaxially in a similar manner as in Example 16, while perchloroethylene was being sprayed on the film under stretching conditions. The resultant film had an excellent ink-fixing property.

EXAMPLE 39

A mixed solvent of perchloroethylene and dimethylformamide at a mixing ratio by weight of 8:2 was coated on the surface of the film obtained in Example 3. Ater 10 seconds passed since the coating, the film was washed with methanol. The resultant film exhibited improved ink-acceptability and ink-drying property, and had high whiteness.

EXAMPLE 40

The film obtained in Example 7 was dipped for 3 minutes in dimethylformamide maintained at 80° C. to thereby elute the polystyrene contained in the film as the additive resin, and then the film was washed with water. The so-treated film exhibited improved whiteness, ink-acceptability and ink-drying property over the untreated film.

EXAMPLE 41

While the film obtained in Example 21 was being passed through metal nip rolls maintained at 90° C., silica wetted with toluene was fed from above the nip rolls and applied onto the film surface. The resultant film exhibited good ink-drying and ink-fixing properties.

EXAMPLE 42

While the film obtained in Example 4 was being passed through metal nip rolls maintained at 150° C., calcium carbonate was fed from above the nip rolls and applied onto the film surface. Then, the film was treated with a super calender. The resultant film had excellent printability and had a touch quite similar to that of art paper.

EXAMPLE 43

An aqueous suspension containing 30% by weight of polyethylene and 100 parts by weight per 200 parts by weight of the polyethylene of clay was coated at a ratio of 10 g./m.$^2$ on the surface of the film obtained in Example 3 with the use of a reverse coater. Then, the film was treated with a super calender. The resultant film exhibited excellent ink-fixing and ink-drying properties, and had high mechanical strengths and surface strength.

EXAMPLE 44

A coating composition consisting of 50 parts of calcium carbonate, 50 parts of a methanol sol containing 30% by weight of silicon dioxide, 50 parts of a vinyl acetate-ethyl acrylate copolymer, 10 parts of an uncured phenol resin, 0.2 part of a curing agent and 150 parts of methanol was coated at a ratio of 8 g./m.$^2$ on both surfaces of the film obtained in Example 24 with the use of a metal bar. Then, the film was treated with a super calender maintained at 100° C. under a linear pressure of 80 kg./cm. at a rate of 20 m./min. The surface of the resultant film was smoother than that of art paper and the surface strength of the film was higher than that of art paper. Further, the film had excellent ink-drying and ink-fixing properties.

EXAMPLE 45

A composition consisting of 50 parts of clay, 50 parts of calcium carbonate and 100 parts of an ethylene-vinyl acetate copolymer was homogeneously mixed at 100° C. While the sheet obtained in a similar manner as in Example 2 was being stretched in a manner as in Example 2, the above homogeneous mixture was blown in a fine spray onto the surface of the sheet. The resultant film had excellent surface strength and abrasion resistance, and exhibited a good property of drying an oil ink.

EXAMPLE 46

A coating composition consisting of 50 parts of diatomaceous earth, 50 parts of kaoline, 10 parts of titanium oxide, 30 parts of modified starch, 10 parts of a styrene-butadiene latex and 0.4 part of sodium hexametaphosphate was coated at a ratio of 10 g./m.$^2$ on the surface of the film obtained in Example 18. The coated film was dried with the hot air and then treated with a super calender at 90° C. under a linear pressure of 80 kg./cm. The resultant film had excellent ink-drying and ink-fixing properties, and the surface of the film was much smoother than that of art paper. A precise printing could be conducted well on the film.

EXAMPLE 47

A coating composition consisting of 80 parts of magnesium sulfate, 20 parts of powdery silicic anhydride, 30 parts of a methyl methacrylate and 0.15 part of benzoyl peroxide was coated at a ratio of 10 g./m.$^2$ on the surface of the film obtained in Example 14 by means of a kiss roll, and the coated film was dried at 100° C. for 20 minutes. The resultant film had excellent surface hardness, surface strength and bending resistance. The film, when printed with an oil ink, exhibited ink-drying and ink-fixing properties comparable to those of art paper.

EXAMPLE 48

A 6 wt. percent solution of cobalt naphthenate in toluene was coated on the surface of the film obtained in Example 47 and then, the film was dried with hot air. The resultant film exhibited a superior ink-drying property compared with the film obtained in Example 47.

EXAMPLE 49

A 3 percent solution of polyacrylonitrile in dimethylformamide was coated at a ratio of 5 g./m.$^2$ on the surface of the film obtained in Example 9 by means of a kiss roll. Thereafter, the film was dipped into water for 10 seconds and treated with a super calender at 100° C. under a linear pressure of 80 kg./cm. The resultant film was superior in the property of fixing an oil ink than art paper.

EXAMPLE 50

The surface of the film obtained in Example 8 was impregnated with a 10 wt. percent solution of polyethyl acrylate in toluene, and then coated with a composition consisting of 100 parts of calcium carbonate, 20 parts of polyethyl acrylate and 100 parts of toluene at a ratio of 10 g./m.$^2$ by means of a bar coater. The resultant film was superior in properties of drying and fixing an oil ink than art paper. The film was also superior in the surface strength than art paper.

COMPARATIVE EXAMPLE 1

A comparative experiment was conducted to determine the transparency and graphic properties of a sheet containing neither inert material nor additive resin as follows:

A high density polyethylene in which neither inert material nor additive resin had been incorporated was melted by heating and was extruded by an extruder into a film. After cooling, the film was heated again to 120° C. and was simultaneously biaxially stretched by a stretching machine at a draw ratio of 3.5 times in the longitudinal direction and at a draw ratio of 3.5 times in the transverse direction.

The resultant sheet had a transparency of 92% and had no graphic property.

COMPARATIVE EXAMPLE 2

A further comparative experiment was conducted in accordance with U.S. Pat. 3,515,626 as follows:

A high density polyethylene contaning 4% of Celite (diactomaceous silica) was stretched at a draw ratio of 3.5 times both in the longitudinal and the transverse directions by the same method as that of Example 2 of U.S. Pat. 3,515,626, and in this way a film corresponding to the outermost layer of the film of such Example 2 was obtained.

This film had a transparency of 73%. Since this film had no porous, multi-layered structure, it was not severed into layers when a peeling-off test was conducted by applying an adhesive cellophane tape thereto.

COMARATIVE EXAMPLE 3

A further comparative experiment was conducted in accordance with U.S. Pat. 3,515,626 as follows:

A laminated film having a three-layered structure (two outer layers consisted of a high density polyethylene containing 4% of Celite, and one inner layer consisted of high density polyethylene alone) was quenched, heated again to 120° C. and then biaxially stretched at a draw ratio of 3.5 times simultaneously both in the longitudinal and the transverse directions.

The resultant film had a total thickness of 100µ, and an outer layer thickness of 10µ. It had a transparency of 80%.

An adhesive cellophane tape was applied to the surface of this laminated film and it was subjected to the peeling-off test, but no peeling-off resulted since no porous, multi-layered structure had been formed on the outer layer.

COMPARATIVE EXAMPLE 4

A further comparative experiment was conducted in accordance with U.S. Pat. 3,515,626 as follows:

A three-layer laminated film was prepared having outer layers consisting of high density polyethylene containing 10% of Celite and an inner layer consisting entirely of high density polyethylene.

This laminated film was quenched, heated again to 120° C., and then biaxially stretched simultaneously at a draw ratio of 3.5 times both in the longitudinal and the transverse directions.

The resultant film had a transparency of 60%. No peeling-off resulted when this film was subjected to the peeling-off test by the use of an adhesive cellophane tape.

In comparison with the foregoing comparative examples, a synthetic paper was prepared following the procedure of Example 1 of the present application. The sample when tested had a transparency as low as 2% and an apparent specific gravity of 0.31. The sample was white, opaque and provided an excellent light-weight film.

When an adhesive cellophane tape was applied to the sheet surface in accordance with the present invention and the sheet was subjected to a peeling-off test, the porous structure on the sheet surface was peeled off in a thin layer.

While the present invention has been described primarily with regard to the foregoing specific examples, it is urged that the present invention is in no way to be deemed as limited thereto but, rather, must be construed as broadly as all or any equivalents thereof.

What is claimed is:

1. A process for the preparation of paper-like thermoplastic resin films which consists essentially of melt mixing and kneading a composition consisting essentially of 100 parts by weight of at least one olefin resin, 5 to 50 parts by weight of at least one additive resin selected from the group consisting of styrene resins, acrylate resins, acetal resins, phenoxy resins, vinyl chloride resins, vinyl acetate resins and amide resins, 10 to 300 parts by weight of at least one inorganic filler with an average particle size of less than 20 microns, said additive resin and said inorganic filler comprising at least 47.5 parts per 100 parts by weight of said olefin resin, and at least one member selected from the group consisting of polyurethane rubbers, styrene-butadiene rubbers, polybutadiene rubbers and propylene oxide rubbers, the amount of said rubber not exceeding the total amount of said olefin resin, said additive resin, and said inorganic filler; shaping the melt mixed and kneaded composition into a single-layered sheet; and thereafter stretching the sheet biaxially at a speed of 40 to 220 cm. per minute at a temperature ranging from 100 to 170° C. to a stretch ratio in at least one direction of at least 1.5 so as to form a multi-cellular multi-layered structure from said single-layered sheet.

2. The process of claim 1 wherein said rubber is employed in an amount of about 2.9 to about 22.6 parts by weight based upon the weight of the composition.

References Cited

UNITED STATES PATENTS

| | | | |
|---|---|---|---|
| 3,515,626 | 6/1970 | Duffield | 264—210 R |
| 3,637,906 | 1/1972 | Parathoën | 264—289 |
| 3,382,305 | 5/1968 | Breen | 264—171 |
| 3,551,538 | 12/1970 | Yamamoto et al. | 264—176 R |
| 3,548,048 | 12/1970 | Hughes et al. | 264—147 |
| 3,597,498 | 8/1971 | Christensen | 260—857 |
| 3,234,313 | 2/1966 | Miller et al. | 264—230 |
| 3,252,934 | 5/1966 | Jankens | 264—DIG. 47 |

ROBERT F. WHITE, Primary Examiner

J. R. THURLOW, Assistant Examiner

U.S. Cl. X.R.

264—171, 210 R, 211, 289, 349